3 Sheets--Sheet 1.

M. VAN B. HOWE.

Tilting-Chairs.

No. 5 419.

Reissued May 20, 1873.

Witnesses:

H. L. Mattenberg.

W. Lovell

Inventor:

Martin Van Buren Howe per [illegible]

Atty

AM. PHOTO-LITHOGRAPHIC CO. N.Y. (OSBORNE'S PROCESS.)

3 Sheets--Sheet 2.

M. VAN B. HOWE.

Tilting-Chairs.

No. 5,419. Reissued May 20, 1873.

Witnesses.

H. L. Mattsberg

W. Lovell

Inventor:

Martin Van Buren Howe per G. W. Griffin

Atty

AM. PHOTO-LITHOGRAPHIC CO. N.Y. (OSBORNE'S PROCESS.)

3 Sheets--Sheet 3.

M. VAN B. HOWE.

Tilting-Chairs.

No. 5,419.

Reissued May 20, 1873.

Witnesses:

H. C. Mattenberg.

W. Lovell

Inventor:

Martin Van Buren Howe per G. Mappuston.

Atty.

AM. PHOTO-LITHOGRAPHIC CO. N.Y. (OSBORNE'S PROCESS.)

UNITED STATES PATENT OFFICE.

MARTIN VAN BUREN HOWE, OF GARDNER, MASSACHUSETTS, ASSIGNOR TO HEYWOOD BROTHERS & CO., OF SAME PLACE.

IMPROVEMENT IN TILTING CHAIRS.

Specification forming part of Letters Patent No. 73,721, dated January 28, 1868; reissue No. 5,419, dated May 20, 1873; application filed May 10, 1873.

*To all whom it may concern:*

Be it known that I, MARTIN VAN BUREN HOWE, of Gardner, in the county of Worcester and State of Massachusetts, have invented an Improved Tilting-Seat Chair, of which the following is a full, clear, and exact description, reference being had to the accompanying drawing making part of this specification, in which—

Figure 2:
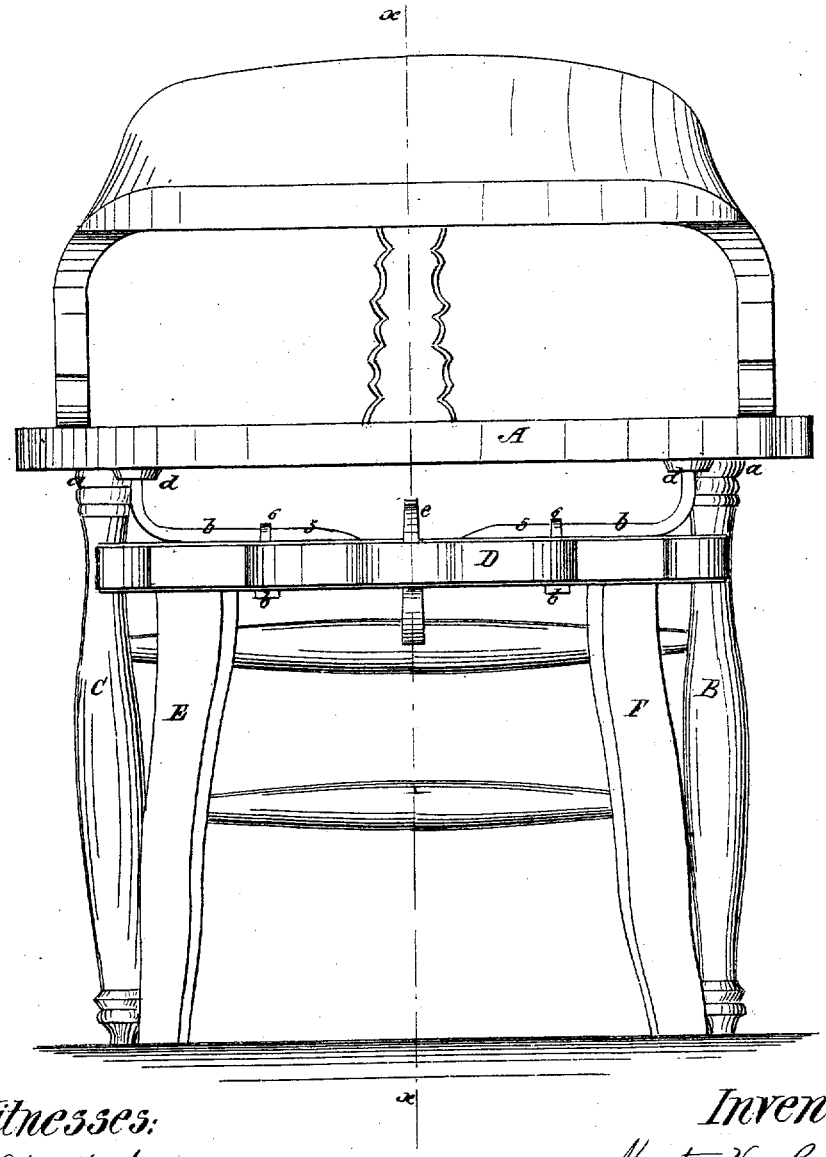
Figure 2:
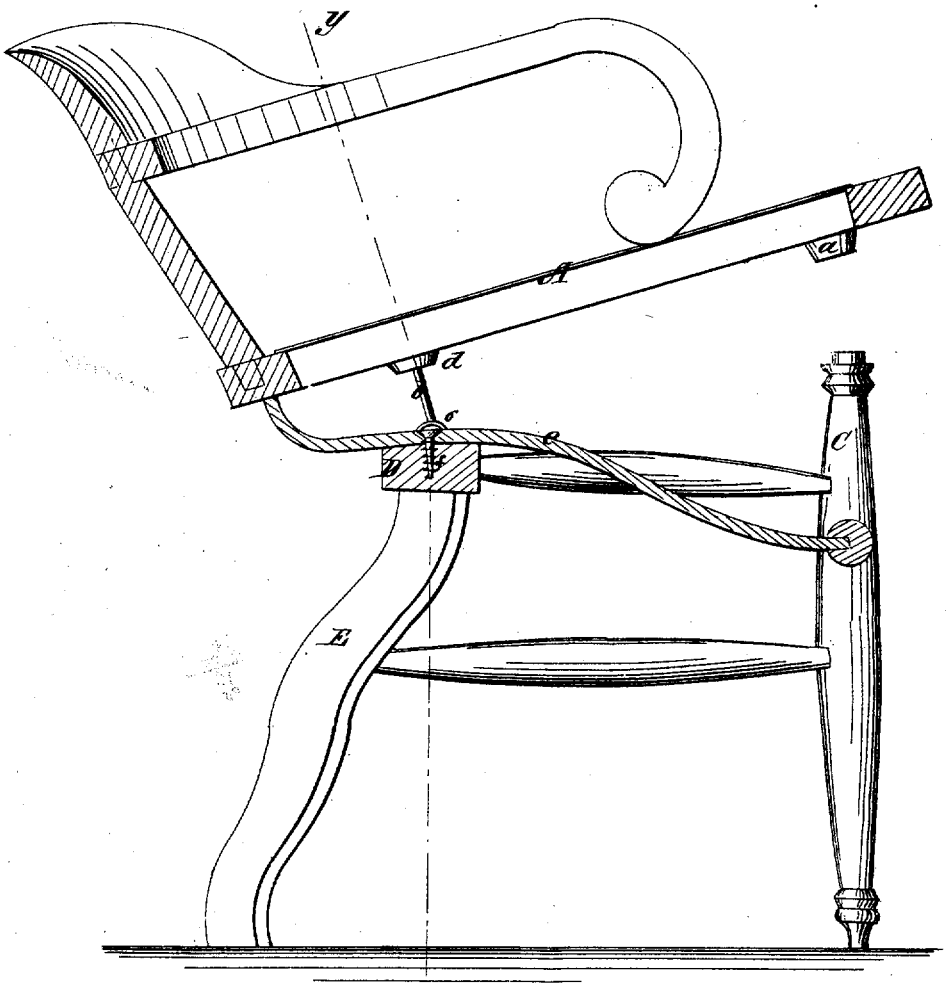
Figure 3:
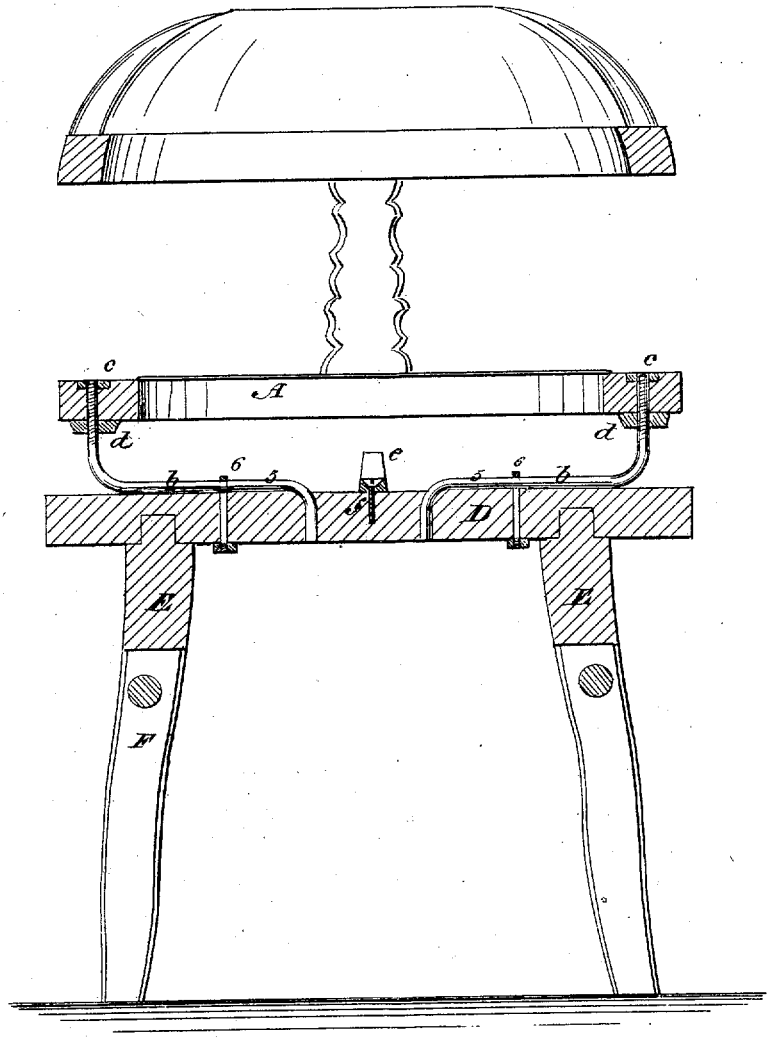
Figure 4:
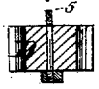

Figure 1 is a rear elevation of my improved chair; Fig. 2 is a vertical section on the line *x x* of Fig. 1, the seat being tilted back. Fig. 3 is a vertical section on the line *y y* of Fig. 2, with the seat in place; Fig. 4, detail to be referred to.

The object of this invention is an improvement in tilting chairs, and the invention consists in a tilting chair constructed in such manner that the rear of the seat of the chair is connected directly to the rear posts or cross-bars extending over them, the ordinary frame under the seat being dispensed with, in this manner reducing the cost and simplifying the construction of the chair, the front of the seat when in its normal position simply resting upon the front posts or their cross-bar, and being free to swing or tilt up when the occupant moves back in an inclined position, the pressure backward occasioned thereby, causing the seat to swing or tilt back, as required, a suitable stop being provided to prevent its being tipped down too far. The invention further consists in a tilting chair provided with rod-springs so placed that the torsional elasticity therein facilitates the tilting of the chair.

To enable others skilled in the art to understand and use my invention, I will proceed to describe the manner in which I have carried it out.

In the said drawing, A is the seat of a chair, the under side of the front of which is provided with sockets or cup-shaped recesses *a* for the reception of the upper ends of the front posts B C. The back of the seat is connected by bent metal rods or wires *b* to the cross-bar D, in which the upper ends of the rear posts E F are secured. Each of the upper ends of these wires is provided with a screw-thread, upon the upper end of which a screw-nut, *c*, is turned flush with the upper surface of the seat A, a nut, *d*, fitting on the lower end of the screw-thread, and being turned up snugly against the under side of the seat to insure the parts being more securely held together. The horizontal portion 5 of these wires is confined upon the top of the cross-bar D in an upright position, as shown in cross-section, Fig. 4, by means of an eye-bolt, 6, secured immovably within the cross-bar D by a screw-nut, 7, the lower ends of these wires being led down vertically through the cross-bar, and the wires serving as springs by which construction, when the occupant assumes an inclined position, these wires or springs are bent or twisted over by his weight and the pressure of his back, and the seat yields to conform thereto, and is tilted into the position shown in Fig. 2. *e* is a bent arm or stop screwed or otherwise secured at *f* to the cross-bar D, one end of the stop being attached to one of the front rounds of the chair, while its other end is bent up, as shown in Fig. 2, to prevent the seat from being tipped back too far. When the chair is vacated, or when the pressure on its back is relieved by the occupant sitting uprightly, the front of the seat is thrown by the recoil of the springs *b* into its original position, (see Fig. 1,) the sockets *a* fitting snugly down upon and inclosing the tops of the posts B C and preventing any lateral play of the seat thereon.

It is evident that the exact form of the springs *b*, and their points of connection with the seat and rear posts, or their cross-bar, may be varied without departing from the spirit of my invention. The seat may also be connected to the rear posts or to their cross-bar by ball and socket joints or hinges, but I prefer to use the springs as above described.

By constructing a chair without the auxiliary frame heretofore used under the seat, and attaching it by springs directly to the rear posts or to the cross-bar over them, the chair is much lighter, more stylish in appearance, and can be furnished at a less cost.

Having thus described my invention, what I claim as new, and desire to secure by Letters Patent, is—

1. A chair constructed so that the seat thereof is connected to the rear posts of the same or their cross-bars by means of torsional rod-springs, substantially for the purpose set forth.

2. In combination with the above, the stop *e*.

3. A tilting chair, constructed with torsional rod-springs, whereby the tilting of the same is facilitated by the torsional elasticity of said springs.

MARTIN VAN BUREN HOWE.

Witnesses:
THOS. ELSLEZIER,
E. O. HOWE.